No. 859,318. PATENTED JULY 9, 1907.
E. W. MIX & P. BUNET.
DYNAMO ELECTRIC MACHINE.
APPLICATION FILED NOV. 20, 1906.
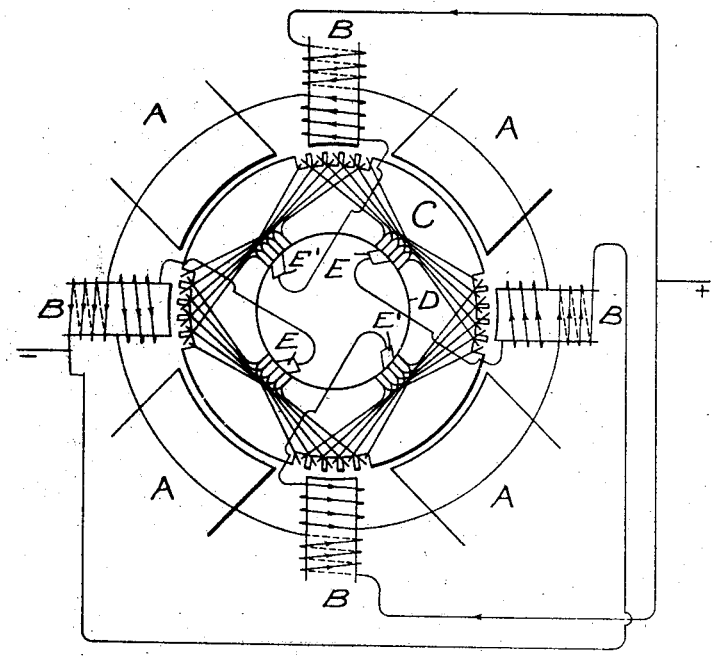
Witnesses:
M. Ray Taylor.
Inventors:
Edgar W. Mix
Paul Bunet
by Albert G. Davis
Atty.

UNITED STATES PATENT OFFICE.

EDGAR W. MIX AND PAUL BUNET, OF PARIS, FRANCE, ASSIGNORS TO GENERAL ELECTRIC COMPANY, A CORPORATION OF NEW YORK.

DYNAMO-ELECTRIC MACHINE.

No. 859,318.        Specification of Letters Patent.        Patented July 9, 1907.

Application filed November 20, 1906. Serial No. 344,273.

*To all whom it may concern:*

Be it known that we, EDGAR W. MIX, a citizen of the United States, residing at Paris, France, and PAUL BUNET, a citizen of France, residing at Paris, France, have invented certain new and useful Improvements in Dynamo-Electric Machines, of which the following is a specification.

Our invention relates to dynamo-electric machines with commutating poles, and its object is to provide a novel arrangement of the magnetizing windings of the commutating poles so as to insure at all times the proper pole strength for perfect commutation.

It has ordinarily been the custom heretofore to connect the windings of all the commutating poles in series with each other and with the main circuit. With this arrangement of the commutating poles, they are all of the same strength, while in certain cases the currents in the armature conductors beneath the several poles are unequal, and consequently some of the poles are too strong and the others too weak. Such a condition may arise in a multipolar machine having a parallel or lap wound drum armature. Since in such a machine there are a plurality of armature circuits in parallel, the current may divide unequally between these parallel circuits due to an inequality in the air gap or to other causes, so that the armature current beneath one commutating pole may be much stronger than that beneath another pole. Our invention consists in providing means for magnetizing each pole at all times proportionately to the current in the armature conductors beneath that pole, regardless of unbalanced load in the several armature circuits.

In a multipolar machine with a parallel-wound armature of the conductors, which at any instant are beneath a commutating pole, half are in electrical connection with one adjacent brush, while the other half are in electrical connection with the other adjacent brush, which is of opposite polarity. The currents in these two brushes and consequently in the two sets of conductors may be unequal. The strength of the commutating pole should be proportional to the total current in the armature conductors beneath it. Therefore in order to secure the proper strength in the different poles, we provide two coils for each pole connected in series respectively with the two adjacent brushes.

Our invention will be best understood from the accompanying drawing which shows diagrammatically a dynamo-electric machine arranged in accordance with our invention.

In the drawing we have shown a four pole machine with a parallel-wound armature of the usual type. The main field poles are represented by A, the commutating poles by B, and the armature by C.

In order to simplify the drawing, only that portion of the armature winding which is beneath the commutating poles is shown.

D represents the commutator on which bear four brushes or sets of brushes. The positive brushes are represented by E E, and the negative by E' E'.

Considering the armature conductors beneath any of the commutating poles, it will be seen that half of them belong to coils that are engaged by a positive brush E, while the other half belong to coils that are engaged by a negative brush E'. Since the current leaving either positive brush may divide unequally between the negative brushes upon its return, the currents in two brushes adjacent to any commutating pole are not necessarily equal. That is the currents in the two sets of armature conductors beneath any pole may be unequal. Consequently in order to assure the proper strength of the several poles, we provide each pole with two windings which are connected in series with the two adjacent brushes or sets of brushes respectively. With this arrangement the strength of the commutating poles is always proportional to the strength of current in the armature conductors beneath the pole, regardless of any unbalancing of load in the several circuits of the armature.

What we claim as new and desire to secure by Letters Patent of the United States, is,—

1. In a multipolar dynamo-electric machine, a parallel-wound drum armature, a field magnet provided with commutating poles, and means for producing a magnetization of each pole at all times proportional to the current in the armature conductors beneath that pole regardless of unbalanced load in several armature circuits.

2. In a multipolar dynamo-electric machine, a parallel-wound drum armature, a field magnet having commutating poles, and two windings on each pole connected respectively directly in series with the two adjacent commutator brushes.

3. In a multipolar dynamo-electric machine, a parallel-wound drum armature, a field magnet having commutating poles, and means for producing in each pole two magnetomotive forces proportional respectively to the currents flowing through the two adjacent commutator brushes.

In witness whereof, we have hereunto set our hands this 29th day of October, 1906.

EDGAR W. MIX.
PAUL BUNET.

Witnesses:
WERNER HILDEBRAND,
HANSON C. COXE.